United States Patent [19]

Ahn

[11] Patent Number: 5,848,409
[45] Date of Patent: *Dec. 8, 1998

[54] SYSTEM, METHOD AND COMPUTER PROGRAM PRODUCT FOR MAINTAINING GROUP HITS TABLES AND DOCUMENT INDEX TABLES FOR THE PURPOSE OF SEARCHING THROUGH INDIVIDUAL DOCUMENTS AND GROUPS OF DOCUMENTS

[75] Inventor: Don Ahn, Daly City, Calif.

[73] Assignee: SmartPatents, Inc., Mountain View, Calif.

[*] Notice: The term of this patent shall not extend beyond the expiration date of Pat. No. 5

[21] Appl. No.: 905,727

[22] Filed: Aug. 4, 1997

Related U.S. Application Data

[63] Continuation of Ser. No. 422,528, Apr. 14, 1995, Pat. No. 5,696,963, which is a continuation-in-part of Ser. No. 341,129, Nov. 18, 1994, which is a continuation-in-part of Ser. No. 155,752, Nov. 19, 1993, Pat. No. 5,623,681.

[51] Int. Cl.$^6$ ..................................................... G06F 17/30
[52] U.S. Cl. .............................................. 707/3; 707/102
[58] Field of Search ........................................ 707/3, 102

[56] References Cited

U.S. PATENT DOCUMENTS

| | | | |
|---|---|---|---|
| Re. 32,632 | 3/1988 | Atkinson | 340/709 |
| 4,205,780 | 6/1980 | Burns et al. | 235/454 |
| 4,270,182 | 5/1981 | Asija | 364/900 |
| 4,486,857 | 12/1984 | Heckel | 364/900 |
| 4,533,910 | 8/1985 | Sukonick et al. | 340/721 |
| 4,555,775 | 11/1985 | Pike | 364/900 |
| 4,622,545 | 11/1986 | Atkinson | 340/747 |
| 4,736,308 | 4/1988 | Heckel | 364/518 |
| 4,748,618 | 5/1988 | Brown et al. | 370/94 |

(List continued on next page.)

FOREIGN PATENT DOCUMENTS 0239884  10/1987  European Pat. Off. .

OTHER PUBLICATIONS

"Agent Searching," Executive Technologies, Inc., Last Updated: Jan. 12, 1996.

Albert, M., *CD–ROM: The Next PC Revolution*, Fortune Magazine, Jun. 29, 1992.

Albert, M., *Easy Access to Patents*, Fortune Magazine, Jun. 29, 1992.

Alexander, *Visualizing Cleared–Off Desktops*, *Computerworld*, May 6, 1991, p. 20.

Banet, "Creating a CD–ROM: overview of the product field," The Seybold Report on Desktop Publishing, v. 7, N. 6, p. 3(29), Feb. 1993.

(List continued on next page.)

*Primary Examiner*—Wayne Amsbury
*Attorney, Agent, or Firm*—Sterne, Kessler, Goldstein & Fox P.L.L.C.

[57] ABSTRACT

A system for searching through documents maintained in electronic form is described. The system is capable of searching through individual documents, or groups of documents. In the case of a group of documents, the system operates by locating one or more hit entries in a group hits table associated with a keyword in a search request. Each of the located hit entries corresponds to a different document in which the keyword appears. The system extracts from the located hit entries hit information indicating the number of times the keyword appears in documents respectively associated with the located hit entries. This hit information is presented to a user, and a command identifying one of the documents respectively associated with the located hit entries is received from the user. The system then locates one or more location entries in a document index table associated with the identified document. These located location entries are associated with the keyword, and each of the located location entries corresponds to a different occurrence of the keyword in the identified document. The system then presents to the user portions of the identified document containing occurrences of the keyword as identified by the located location entries.

33 Claims, 5 Drawing Sheets

U.S. PATENT DOCUMENTS

| | | | |
|---|---|---|---|
| 4,772,882 | 9/1988 | Mical | 340/709 |
| 4,785,408 | 11/1988 | Britton et al. | 364/513.5 |
| 4,788,538 | 11/1988 | Klein et al. | 340/747 |
| 4,812,834 | 3/1989 | Wells | 340/721 |
| 4,847,604 | 7/1989 | Doyle | 340/706 |
| 4,873,623 | 10/1989 | Lane et al. | 364/188 |
| 4,884,223 | 11/1989 | Ingle et al. | 364/550 |
| 4,899,136 | 2/1990 | Beard et al. | 340/706 |
| 4,914,732 | 4/1990 | Henderson et al. | 340/825.17 |
| 4,931,783 | 6/1990 | Atkinson | 340/710 |
| 4,935,865 | 6/1990 | Rowe et al. | 364/188 |
| 4,939,507 | 7/1990 | Beard et al. | 340/706 |
| 4,959,769 | 9/1990 | Cooper et al. | 364/200 |
| 4,977,455 | 12/1990 | Young | 358/142 |
| 4,985,863 | 1/1991 | Fujisawa et al. | 364/900 |
| 4,991,087 | 2/1991 | Burkowski et al. | 364/200 |
| 5,008,853 | 4/1991 | Bly et al. | 364/900 |
| 5,062,060 | 10/1991 | Kolnick | 364/521 |
| 5,072,412 | 12/1991 | Henderson, Jr. et al. | 395/159 |
| 5,120,944 | 6/1992 | Kern et al. | 235/379 |
| 5,148,154 | 9/1992 | MacKay et al. | 340/712 |
| 5,155,806 | 10/1992 | Hoeber et al. | 395/157 |
| 5,157,768 | 10/1992 | Hoeber et al. | 395/157 |
| 5,163,104 | 11/1992 | Ghosh et al. | 382/56 |
| 5,222,160 | 6/1993 | Sakai et al. | 382/57 |
| 5,228,123 | 7/1993 | Heckel | 395/155 |
| 5,237,158 | 8/1993 | Kern et al. | 235/379 |
| 5,241,671 | 8/1993 | Reed et al. | 395/600 |
| 5,253,362 | 10/1993 | Nolan et al. | 395/600 |
| 5,276,616 | 1/1994 | Kuga et al. | 364/419.08 |
| 5,319,745 | 6/1994 | Vinsonneau et al. | 395/144 |
| 5,349,170 | 9/1994 | Kern | 235/379 |
| 5,392,428 | 2/1995 | Robins | 395/600 |
| 5,404,514 | 4/1995 | Kageneck et al. | 395/600 |
| 5,428,778 | 6/1995 | Brookes | 395/600 |
| 5,432,897 | 7/1995 | Tatsumi et al. | 395/140 |
| 5,440,481 | 8/1995 | Kostoff et al. | 364/419.08 |
| 5,442,778 | 8/1995 | Pedersen et al. | 395/600 |
| 5,444,615 | 8/1995 | Bennett et al. | 364/401 |
| 5,469,354 | 11/1995 | Hatakeyama et al. | 77/5 |
| 5,481,666 | 1/1996 | Nguyen et al. | 395/159 |
| 5,519,857 | 5/1996 | Kato et al. | 395/600 |
| 5,537,526 | 7/1996 | Anderson et al. | 395/148 |
| 5,544,302 | 8/1996 | Nguyen | 395/161 |
| 5,550,976 | 8/1996 | Henderson et al. | 395/200.06 |
| 5,551,055 | 8/1996 | Matheny et al. | 395/882 |
| 5,557,722 | 9/1996 | DeRose et al. | 395/148 |
| 5,559,942 | 9/1996 | Gough et al. | 395/155 |
| 5,568,639 | 10/1996 | Wilcox et al. | 395/600 |
| 5,581,686 | 12/1996 | Koppolu et al. | 395/340 |
| 5,583,982 | 12/1996 | Matheny et al. | 395/326 |
| 5,584,035 | 12/1996 | Duggan et al. | 395/800 |
| 5,592,607 | 1/1997 | Weber et al. | 395/358 |
| 5,592,608 | 1/1997 | Weber et al. | 395/358 |
| 5,596,700 | 1/1997 | Darnell et al. | 395/340 |
| 5,604,901 | 2/1997 | Kelley et al. | 395/603 |
| 5,623,681 | 4/1997 | Rivette et al. | 707/526 |
| 5,628,003 | 5/1997 | Fujisawa et al. | 359/615 |
| 5,696,963 | 12/1997 | Ahn | 707/5 |
| 5,757,983 | 5/1998 | Kawaguchi et al. | 382/305 |

OTHER PUBLICATIONS

Becker, "Voyager kit: Ticket to books on–line,"*MacWeek*, vol. 7, No. 8, Feb. 22, 1993, p. 57.

Berk et al. eds., Hypertext/Hypermedia Handbook, pp. 209–224, 285–297, 329–355, 529–533, Jan. 1991.

Bermant, "Finding It Fast: New Software Features That Search Your System," *Personal Computing*, vol. 11, No. 11, Nov. 1987, pp. 125–131.

Bish, "An Essential ingredient: Post recognition processing," *Imaging World*, vol. 5, Issue 3, Mar. 1996.

Blatt, J., A Primer on User Interface Software Patents, *The Computer Lawyer*, vol. 9, No. 4, Apr. 1992.

Boedeker et al., "Choosing Imaging Software," *Law Office Computing*, vol. 5, Issue 3, Jun./Jul., 1995, pp. 50–55.

"Boolean Searching," Executive Technologies, Inc., Last Updated: Jan. 12, 1996.

Bradbury, "Expanded Book Toolkit," *MacUser*, vol. 9, No. 3, Mar., 1993, p. 85.

Briggs, "CD–ROM publishing boom is Dataware's delight," *MIS Week*, vol. 10, No. 38, Sep. 25, 1989, pp. 40–41.

Briggs, "Dataware Comes to U.S. With CD–ROM Publishing," *MIS Week*, vol. 10, No. 5, Jan. 30, 1989, p. 21.

Brockschmidt, *Inside OLE 2*, Microsoft Press, Redmond, WA, Copyright 1994.

Brockschmidt, "What OLE Is Really About," *OLE Development*, Microsoft Corporation, Copyright 1997, pp. 1–59.

"BRS/Search: An Industrial Strength Document Warehouse Solution—Profile," Dataware Technologies, Copyright May 1996, pp. 1–12.

"BRS/Search," Dataware Technologies, Inc., date unclear.

Catchings et al., "Price Delineates Text–Retrieval Software," *PC Week*, vol. 8, No. 20, May 20, 1991, pp. 120–123.

Catchings et al., "Retrieval Technologies Inc.: re:Search 2.0," PC Week, v. 8, n. 20, p. 121(2), May 1991.

Catlin et al., *InterNote: Extending A Hypermedia Framework to Support Annotative Collaboration*, Hypertext '89 Proceedings, pp. 365 to 378, Nov., 1989.

"CD Author/CD Answer," Dataware Technologies, date unclear.

Patrick P. Chan, *Learning Considerations In User Interface Design: The Room Model*, Software Portability Laboratory, University of Waterloo, Waterloo, Ontario, Canada, Jul. 1984.

"Chapter 1: Component Object Model Introduction," *OLE Development*, Microsoft Corporation, Copyright 1997, pp. 1–37.

Christodoulakis, S., et al., *Browsing Within Time–Driven Multimedia Documents*, Institute for Computer Research, University of Waterloo, Waterloo, Ontario, Canada, pp. 219–227, Jul. 1988.

Classified Search and Image Retrieval Student Manual, U.S. Patent and Trademark Office.

Cohen, "Browsers get BookWorm for Mac," *MacWeek*, vol. 7, No. 39, Oct. 4, 1993, p. 4.

*Commands and Settings*, OmniPage Professional Windows Version 5, Caere Corporation, Chapter 1, pp. 1–1 to 1–70, 1988–1993.

*The Complete Document Profiling and Retrieval System for Windows*, World Software Corporation, WORLDOX, Copyright World Software Corp., 1992.

Conklin, "Hypertext: An Introduction and Survey," Computer, pp. 17–41, Sep. 1987.

Cooper et al., "Oh! Pascal!", pp. 389–399, Jan. 1982.

Cote et al., "Searching for Common Threads," *Byte*, vol. 17, No. 6, Jun., 1992, pp. 290–305.

*Creation/Modification of the Audio Signal Processor Setup for a PC Audio Editor*, IBM Technical Disclosure Bulletin, vol. 30, No. 10, Mar. 1988.

Curran, "Growing company changes data entry," *ImagingWorld*, vol. 4, Issue 3, Mar. 1995.

"Dataware Technologies: Products and Services," Dataware Technologies, Copyright 1996.

Dintzner, J.P. and J. Van Thielen, "Image Handling at the European Patent Office: Bacon and First Page," *World Patent Information*, vol. 13, No. 3, pp. 152–154, 1991.

Doherty, "New Op–Disk Peripherals Displayed at Conference," *Electronic Engineering Times*, No. 339, Jul. 22, 1985, p. 15.

Duncan, "ZyIMAGE's Use of Windows Interface Falls Short of Mark," *LAN Times*, vol. 10, Issue 10 May 24, 1993, pp. 70 and 79.

"Eastern Electricity: BRS/Search Customer Profile," Dataware Technologies, Copyright 1995.

*Editing Recognized Documents*, OmniPage Profession Windows Version 5, Caere Corporation, Chapter 3, pp. 3–1 to 3–20, 1988–1993.

"EZ–C + DE2 Images: The New Standard in Data Capture," Textware Corporation, Copyright 1994, pp. 1–8.

*The Fastest, Most Powerful Full Text Retrieval System*, ZyINDEX 5.2 for Windows, Zylab, 1994.

Fersko–Weiss, "3–D Reading with the Hypertext Edge," *PC Magazine*, vol. 10, No. 10, May 28, 1991, pp. 241–282.

Fish et al., *Quilt: a collaborative tool for cooperative writing*, Conf. on Information Systems '88, pp. 30 to 37, Jan., 1988.

"Forms Processing Products & Services," TextWare Corporation, Copyright 1996.

"FormWare for Windows 95/NT," TextWare Corporation, Copyright 1996.

"Fuzzy Searching," Executive Technologies, Inc., Last Updated: Jan. 12, 1996.

Gerber, "Lotus rolls out gateway for Notes, cc: Mail," InfoWorld, v. 14, N. 46, p. 1(2), Nov. 1992.

Halasz et al., "Issues in the Design of Hypermedia Systems," CHI '90 Tutorial, Jan. 1990.

Harney, "TextWare's FormWare—Complex Data Capture that Puts Simplicity First," *Imaging Magazine*, Apr. 1996.

Haskin, "Textware 4.0: Text Retrieval for Electronic Documents," *Computer Shopper*, vol. 13, No. 8, Aug. 1993, pp. 334–335.

Haskin, "ZyImage Finds Images And Text," *PC–Computing*, vol. 6, No. 5, May 1993, p. 60.

*Help Yourself! With PCT Patent Search On CD–ROM*, MicroPatent, New Haven, CT, appears to be before Jul. 1, 1993.

"Hip Products," ZyLAB Europe BV, Copyright 1996.

Holtz, "Mastering Ventura; Second Edition," pp. 360–375, Jan. 1989.

*How to Install and Use the USAPat Demonstration Disc*, USPTO Office of Information Products Development, 1994(?).

*HyperCard Basics*, Apple Computer, Inc., 1990.

"IDI brings Basic plus down to workgroups," The Seybold Report on Publishing Systems, v. 22, N. 14, p. 16(2), Apr. 1993.

"InnerView for Windows 3.0, For Evaluation Only, Version 2.2 Pre–Release #6," TMS, Inc. Copyright 1991–1992.

Ishii, H., et al., *Clearface: Translucent Multiuser Interface for Team Work Station*, ECSCW, Sep., 1991, pp. 6–10.

Ishii, H., et al., *Toward an Open Shared Workspace, Communications of the ACM*, Dec., 1991, vol. 34, No. 12, pp. 37–50.

Jonckheere, C., "EPOQUE (EPO QUEry service) the Inhouse Host Computer of the European Patent Office," *World Patent Information*, vol. 12, No. 3, pp. 155–157, 1990.

Karraker, "Voyager Toolkit stretches Expanded Book concept to let users pen their own," *MacWeek*, vol. 6, No. 11, Mar. 16, 1992, p. 9.

Knibbe, "ZyImage 2 boosts OCR, batch duties," *InforWorld*, vol. 15, Issue 51, Dec. 20, 1993, p. 20.

Knibbe, "ZyImage 3.0 will facilitate distribution on CD–ROMs; Boasts integration with WordScan OCR software," *InfoWorld*, vol. 16, No. 38, Sep. 19, 1994, p. 22.

Lexis–Nexis Printout of a Business Wire Article Entitled: *TMS Announces Contract With Major Insurance Information Provider*, Business Wire Inc., Feb. 11, 1991.

Lexis–Nexis Printout of a Business Wire Article Entitled: *TMS Announces Easy View Available for CD–ROM Publishers*, Business Wire Inc., Mar. 9, 1992.

Lexis–Nexis Printout of a Business Wire Article Entitled: *TMS Announces Release of Inner View 2.1 Software*, Business Wire Inc., Mar. 18, 1991.

Lougher et al., *Supporting long–term collaboration in software maintenance*, Conf. on Organizational Computing Systems, pp. 228–238, 1993.

Lucas, Jay, "The Progress of Automation at the U.S. Patent and Trademark Office," *World Patent Information*, vol. 14, No. 3, pp. 167–172, 1992.

McEvoy, Ed., *Object Linking and Embedding: Programmer's Reference, Version 1*, Microsoft Press, Redmond, WA, Copyright 1992.

Mallory, "New for Mac: test/graphics retrieval software from TMS," Newsbytes, Jul. 1992.

Marshall, "Text retrieval alternatives: 10 more ways to pinpoint important information," *Infoworld*, vol. 14, No. 12, Mar. 23, 1992, pp. 88–89.

Marshall, "ZyImage adds scanning access to ZyIndex," *InfoWorld*, vol. 16, No. 15, Apr. 11, 1994, pp. 73, 76, and 77.

Marshall, "ZyImage is ZyIndex plus a scan interface integrated," *InfoWorld*, vol. 15, Issue 10, Mar. 8, 1993, p. 100.

Marshall et al., "ZyIndex for Windows, Version 5.0," InfoWorld, v. 15, n. 21, May 1993, pp. 127, 129, 133 and 137.

"MasterView for Microsoft Windows," TMS Inc., Copyright 1993.

Matazzoni, "Expanded Book Toolkit 1.0.1," *Macworld*, vol. 10, No. 6, Jun., 1993, p. 158.

Mendelson, "HyperWriter for Windows," *PC Magazine*, vol. 14, No. 3, Feb. 7, 1995, pp. 140, 142, and 143.

Moore, "Dataware lands $6.6M GPO pact," *Federal Computer Week*, vol. 9, No. 27, Sep. 11, 1995, pp. 84 and 86.

Moore, "The Forms Processing Paradigm Shift," *Imaging Magazine*, Mar. 1995.

"NetAnswer Hosting Service," Dataware Technologies, Inc., Copyright 1995.

"NetAnswer: Information Super Server for the World Wide Web," Dataware Technologies, Inc., Copyright 1995.

"NetAnswers: Organization Worldwide Take Content Onto the Web with NetAnswer," Dataware Technologies, Spring 1996.

OmniPage Professional Tutorials, Windows Version 5, Caere Corp.

Ores, "Hypertext Publishing: Edit Trail," *PC Magazine*, vol. 14, No. 3, Feb. 7, 1995, pp. 132, 134, 136, and 138.

*Patents on CD–ROM, Track Technology, Focus R&D, Watch Competitors, Speed Products to Market, Cut Online/Copy Costs, A World of Opportunities from MicroPatent*, MicroPatent USA, New Haven, CT, appears to be before Sep. 1, 1992.

PatentImages, *User Profile European Patents, Search & Tech Tips, Conference Calendar, MicroPatent World* Newsletter, Spring 1991, New Haven, CT.

A. Pelham, *A Wave of the Wand for Litigators. Tools of the Trade Go High–Tech*, Focus on Technology, Legal Times, Jan. 24, 1994.

Perenson, "Retrieving Text on the Net," *PC Magazine*, vol. 14, No. 20, Nov. 21, 1995, p. 61.

*Previewing the Letter*, WordPefect Workbook for IBM Personal Computers, WordPerfect Corporation, Version 5.0, Lesson 4, p. 24 and Lesson 13, pp. 108–109, 1988.

Print out of *On–Line Help Manual*, Innerview for Windows 3.0, Version 2.2, Pre–Release #6, TMS, Inc. 1991–1992.

Quattro Pro User's Guide, Borland Int'l, Inc., p. 245, Jan. 1989.

"re:Search V. 2.6," Software Product Specification, Computer Select, Nov. 1993.

Rooney, "Text–retrieval veterans prepare Windows attack," PC Week, v. 9, n. 24, p. 46, Jun. 1992.

Rooney, "ZyLab partners with Calera: firms roll out document–image system," *PC Week*, vol. 10, No. 3, Jan. 25, 1993, p. 22.

Schroeder, "Low Price Point Is Key for Buyers Of Test Databases," *PC Week*, vol. 8, No. 20, May 20, 1991, pp. 120 and 122.

Schroeder, "Multimedia offerings target expanded platform support," *PC Week*, vol. 10, No. 13, Apr. 5, 1993, pp. 59 and 73.

Schwartz, "Dataware Plants CD–ROM Seeds," *Computer Systems News*, No. 403, Feb. 6, 1989, p. 33.

Search Results from Dialog Search for MicroPatent for News Releases and Corporate Announcements Relating to APS, FullText, PatentImages, Espace, Dialog Files: 148, 479 and 648, 1989–1991.

Simon, "ZyImage: A Winning Combination of OCR And Text Indexing," *PC Magazine*, vol. 12, No. 6, Mar. 30, 1993, p. 56.

Simpson, Mastering WordPerfect 5.1 & 5.2 for Windows, p. 58.

Somers, "Personal Text–Retrieval Software Works with Calera's WordScan," *PC Magazine*, vol. 14, No. 2, Jan. 24, 1995, p. 68.

Spencer, "Tijuana data entry shop logs 500K forms/day," *ImagingWorld*, vol. 4, Issue 4, Apr. 1995.

Spitzer, "Needles in Document Haystacks" *DBMS*, vol. 9, No. 1, Jan. 1996, pp. 84–87.

Sullivan, "Dataware's CD Author System To Boast Hypertext Capability," *PC Week*, vol. 8, No. 31, Aug. 5, 1991, pp. 31–32.

"Text Retrieval Products & Services," TextWare Corporation, Copyright 1996.

"TextWare: Instant Information Access," TextWare Corporation, Copyright 1995.

"TextWare Pricing," TextWare Corporation, Effective Mar. 26, 1996.

Thomson et al., *Full Write Professional—A User's Guide*, pp. 99–122, 1988.

Torgan, "ZyImage: Document Imaging and Retrieval System," *PC Magazine*, vol. 12, No. 3, Feb. 9, 1993, p. 62.

"Toshiba American Information Systems: CD–ROM Customer Profile," Dataware Technologies, Copyright 1995.

"Total Recall," Dataware Technologies, Copyright 1995.

Tredennick, Jr., J. C., *Full–Text Search and Retrieval Winning Big with Computers*, Law Practice Management, vol. 19, No. 8, Nov./Dec., 1993.

Tribute, "Searching CeBit for publishing products; Power Mac draws the crowds at Hannover show," *Seybold Report on Publishing Systems*, vol. 23, No. 15, Apr. 22, 1994, pp. 5–8.

Ueda, H., et al., "An Interactive Natural–Motion–Picture Dedicated Multi–Media Authoring System," Mar., 1991, pp. 343–350.

*Understanding OCR*, OmniPage Professional Windows Version 5, Caere Corporation, Chapter 6, pp. 6–1 to 6–8 and Glossary Pages 1–8, 1988–1993.

"Voyager cd–roms," Voyager, Spring, 1996.

"Voyager: cd–rom catalog," Voyager, 1996–1997.

R. W. Wiggins, *Networked Hypermedia: The World–Wide Web and NCSA Mosaic, The Internet for Everyone—A Guide for Uses and Providers*, Chapter 13, pp. 245–290, McGraw–Hill, Inc., 1995.

"WorldView V. 1.1 and WorldView Press V. 1.0.2," Software Product Specification, Computer Select, Nov. 1993.

Young, "UK Police Put Criminals On–Line With New National Computer," *Imaging Magazine*, Aug. 1995.

"ZyIMAGE," ZyLAB International, Inc., Copyright 1996.

"ZyIMAGE: Common Questions Asked About ZyIMAGE," ZyLAB Europe BV, Copyright 1996.

"ZyIMAGE Web Server," ZyLAB Europe BV, Copyright 1996.

*ZyINDEX Developer's Tookit Version 5.0 for Windows*, Programmers Guide, Information Dimensions, 1992.

"ZyINDEX Developer's Toolkit for Windows, Version 5.0, Programmer's Guide," ZyLAB, Copyright 1992, pp. 1–35.

"ZyINDEX for Windows User's Guide," ZyLAB Division, Copyright 1992, pp. 1–262.

"ZyLAB: The Full Text Retrieval & Publishing Experts," ZyLAB Europe BV, Copyright 1996.

"ZyLab retrieval engine optimized for CD–ROM; ZyLab, Progressive Technologies merge," *Seybold Report on Desktop Publishing*, vol. 8, No. 10, Jun. 6, 1994, p. 40.

SYSTEM, METHOD AND COMPUTER PROGRAM PRODUCT FOR MAINTAINING GROUP HITS TABLES AND DOCUMENT INDEX TABLES FOR THE PURPOSE OF SEARCHING THROUGH INDIVIDUAL DOCUMENTS AND GROUPS OF DOCUMENTS

This application is a continuation of U.S. patent application Ser. No. 08/422,528, filed Apr. 14, 1995, now U.S. Pat. No. 5,696,963, issued Dec. 9, 1997, which is a continuation-in-part of application Ser. No. 08/341,129, filed Nov. 18, 1994, which is a continuation-in-part of Ser. No. 08/155,752, filed Nov. 19, 1993, now U.S. Pat. No. 5,623,681, issued Apr. 22, 1997.

BACKGROUND OF THE INVENTION

1. Field of the Invention

The present invention relates generally to electronic document processing, and more particularly to electronically searching through documents.

2. Related Art

Modern information services and systems provide users with a wealth of information all contained in electronic repositories. These services/systems have little value, however, unless they provide users with search mechanisms for locating information of interest. These search mechanisms must be easily updateable and extendable, since information is constantly being generated.

Accordingly, the present invention is directed to a system and method for performing electronic keyword searches through an individual document, and/or through a group of documents (the documents being maintained electronically).

SUMMARY OF THE INVENTION

The present invention is directed to a system and method for searching through documents maintained in electronic form. The present invention is capable of searching through individual documents, or groups of documents. In the case of a group of documents, the invention operates by locating one or more hit entries in a group hits table associated with a keyword in a search request. Each of the located hit entries corresponds to a different document in which the keyword appears. The invention extracts from the located hit entries hit information indicating the number of times the keyword appears in documents respectively associated with the located hit entries. This hit information is presented to a user, and a command identifying one of the documents respectively associated with the located hit entries is received from the user. The invention then locates one or more location entries in a document index table associated with the identified document. These located location entries are associated with the keyword, and each of the located location entries corresponds to a different occurrence of the keyword in the identified document. The invention then presents to the user portions of the identified document containing occurrences of the keyword as identified by the located location entries.

Further features and advantages of the present invention, as well as the structure and operation of various embodiments of the present invention, are described in detail below with reference to the accompanying drawings. In the drawings, like reference numbers indicate identical or functionally similar elements.

BRIEF DESCRIPTION OF THE FIGURES

The present invention will be described with reference to the accompanying drawings, wherein.

DETAILED DESCRIPTION OF THE PREFERRED EMBODIMENTS

Figure 1:
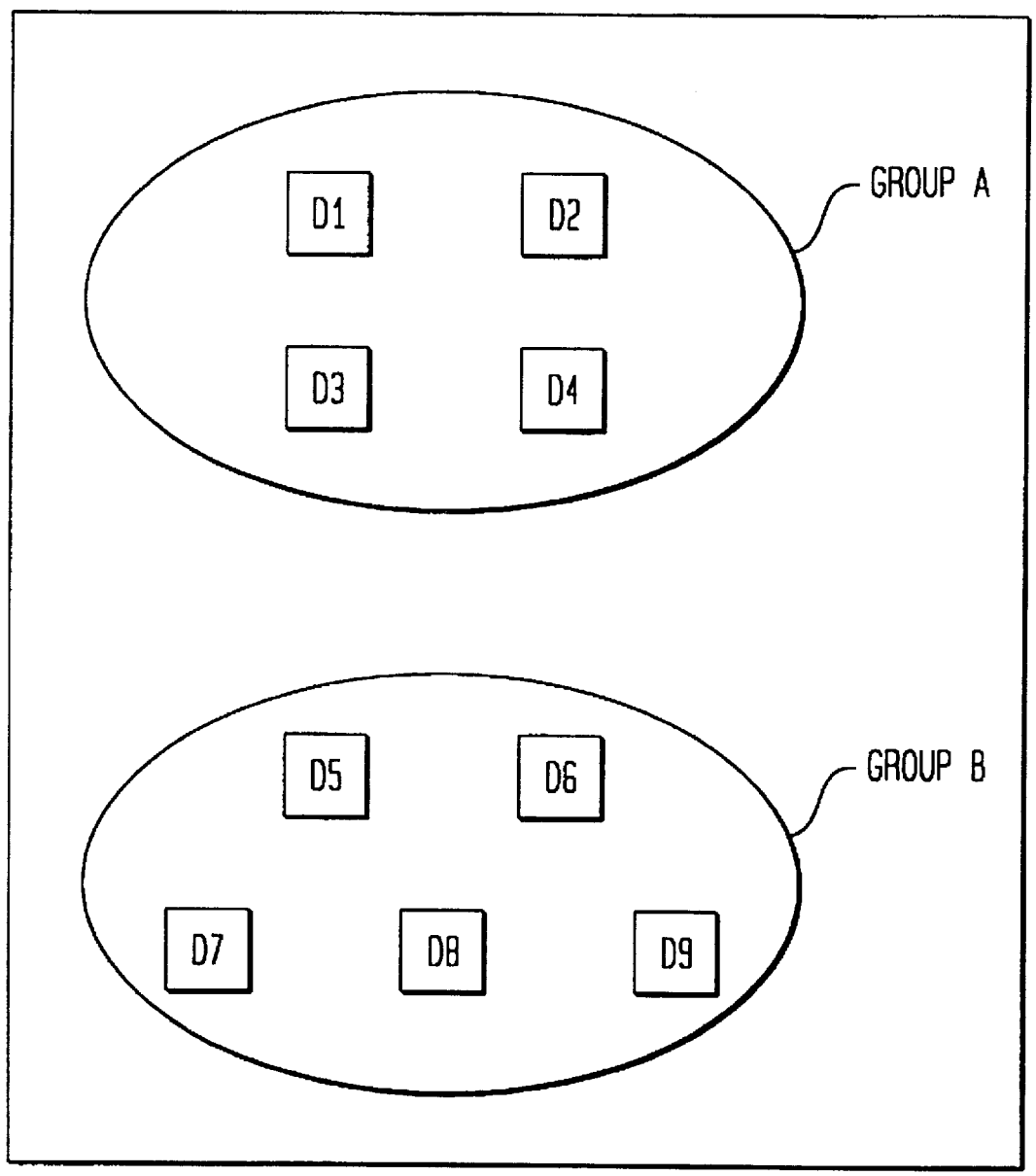
FIG. 1 depicts an example grouping of documents.

The present invention is directed to a system and method for performing electronic keyword searches through an individual document, and/or through a group of documents. Consider an example scenario presented in FIG. 1. Group A includes documents D1, D2, D3, and D4 (in electronic form), and Group B includes documents D5, D6, D7, D8, and D9 (in electronic form). Generally, a group can include any number of documents.

According to the present invention, electronic keyword searches can be performed in each document D1–D9 individually. Also, electronic keyword searches can be performed through all of the documents in Group A, or all of the documents in Group B.

Documents D1–D9 can represent any type of documents, such as books, magazines, articles, journals, etc. According to a preferred embodiment of the present invention, documents D1–D9 represent U.S. and/or non-U.S. patents.

Figure 2:
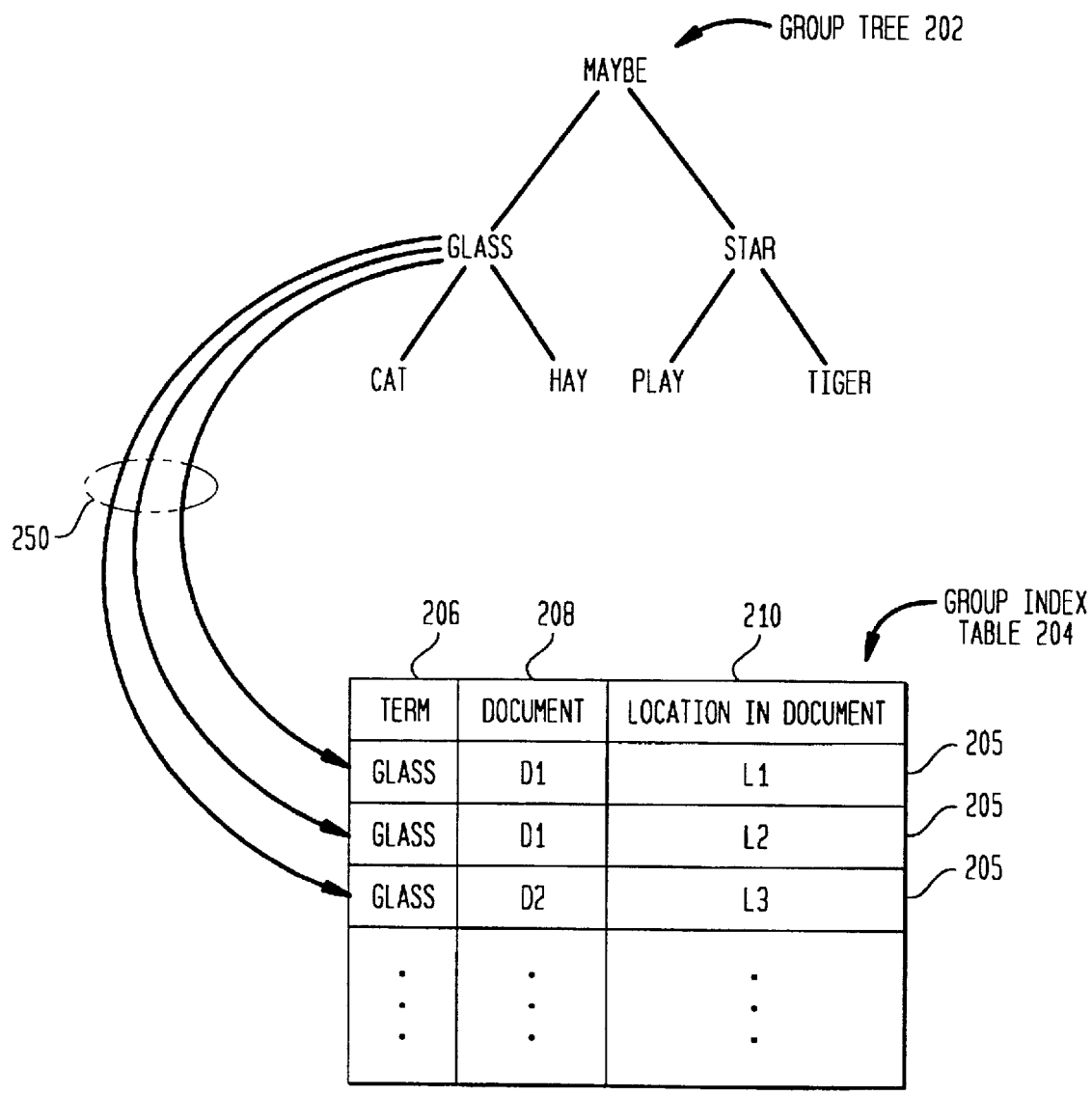
FIGS. 2 and 3 depict tables and search trees used by a first embodiment of the present invention.
Figure 3:
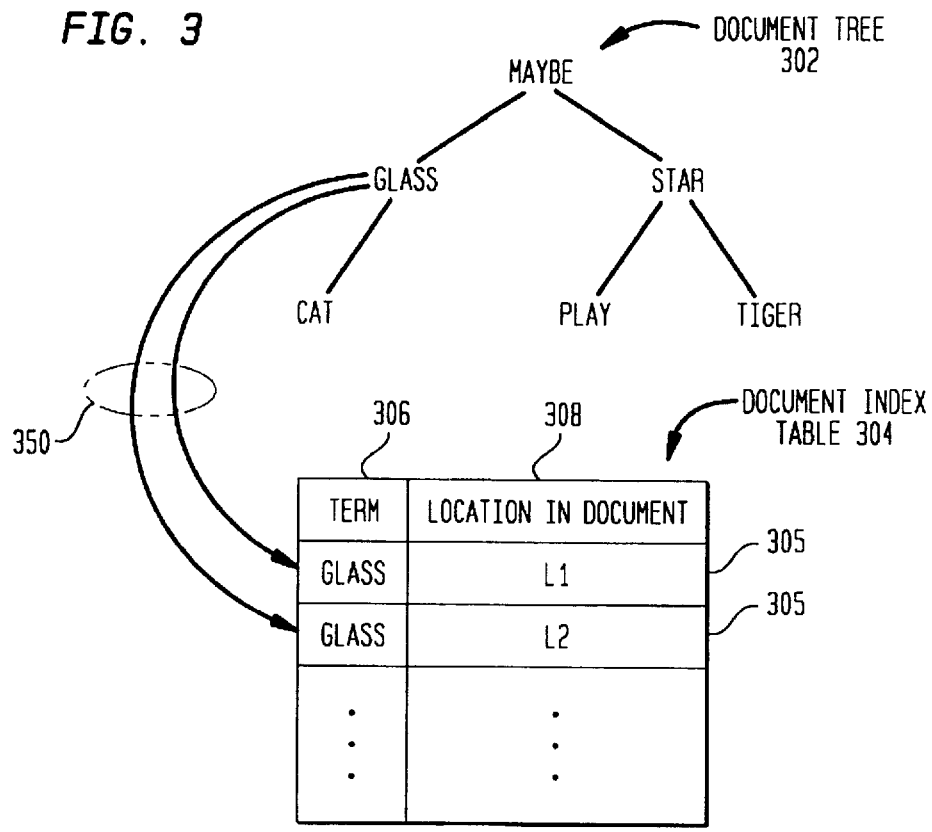

According to a first embodiment of the invention, a group tree and a group index table is maintained for each group (such as Group A). Also, a document tree and a document index table is maintained for each document (such as Document D1). An example group tree 202 and group index table 204 for Group A are shown in FIG. 2. An example document tree 302 and document index table 304 for Document D1 are shown in FIG. 3.

The group index table 204 includes an entry 205 for each occurrence of each searchable term in the documents D1–D4 of Group A. For example, the word "glass" appears in document D1 at locations L1 and L2 (locations L1 and L2 refer to positions in document D1), and also appears in document D2 at location L3 (location L3 refers to a position in document D2). Thus, there are three entries in the group index table 204 for the word "glass."

Each entry 205 includes a term field 206, a document field 208, and a location in document field 210. The term field 206 identifies the searchable word (or phrase), the document field 208 identifies the document where the word appears, and the location in document field 210 identifies the location in the document where the word appears.

The group tree 202 is a tree data structure that is used to locate entries in the group index table 204 associated with particular search keys. The example group tree 202 is a binary tree, but any other well known tree data structure (such as a B-tree) could alternatively be used.

The group binary tree 202 includes a node for each searchable term in the documents D1–D4 of Group A. Each node has a value and two branches, where the left branch is less than the value, and the right branch is greater than the value. Each node also stores one or more pointers to the group index table 204. Consider the node having the value "maybe." The word "glass" is less than "maybe." Thus, the word "glass" is contained in a node connected to the left branch of the "maybe" node. Similarly, the word "star" is greater than "maybe." Thus, the word "star" is contained in a node connected to the right branch of the "maybe" node.

The manner in which the group tree 202 is used to locate entries in the group index table 204 associated with particular search keys shall now be described. Suppose that the search keyword is "glass" (i.e., the user wants to find occurrences of the word "glass" in the documents D1–D4 of Group A). The search begins at the root node of the group tree 202, which is the "maybe" node. If the value of this node is equal to the keyword, then the search is complete. If the value of this node is greater than the keyword, then the left branch is taken. If the value of this node is less than the keyword, then the right branch is taken.

In this case, the value of this node ("maybe") is greater than the keyword ("glass"), so the left branch is taken. The node at the end of this left branch (the "glass" node) is equal to the keyword, so the search is complete. The "glass" node stores three pointers 250 to the group index table 204. These pointers 250 identify the entries in the group index table 204 that are associated with the keyword "glass."

The document index table 304 includes an entry 305 for each occurrence of each searchable term in document D1. Each entry 305 includes a term field 306, and a location in document field 308. The term field 306 identifies the searchable word (or phrase), and the location in document field 210 identifies the location in document D1 where the word appears.

The structure and use of the document tree 302 is the same as the group tree 202, but it includes a node for each searchable term in the document D1.

Figure 4:
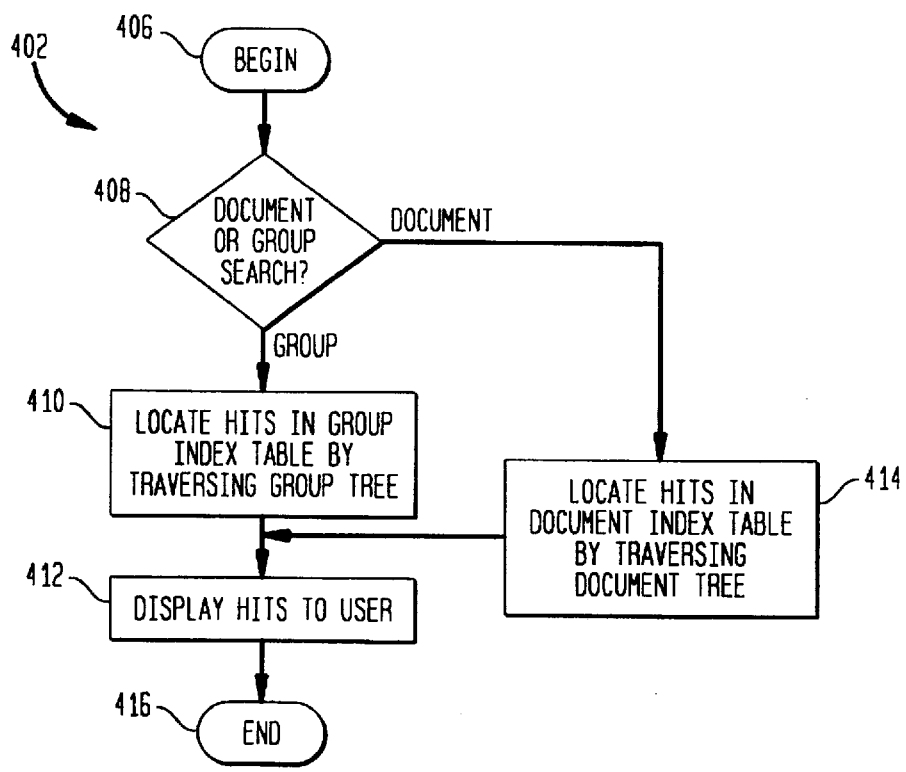
FIG. 4 is a flowchart depicting the operation of the first embodiment of the present invention.

The manner in which the present invention performs electronic keyword searches through an individual document (in electronic form), and/or through a group of documents (in electronic form), shall now be described with reference to a flowchart 402 shown in FIG. 4. Flowchart 402 begins with step 406, where control immediately passes to step 408.

In step 408, the invention receives a user search request containing a keyword and determines whether the search request is directed to searching an individual document or a group of documents. If the search request is directed to searching an individual document, then step 414 is performed.

In step 414, the invention locates occurrences (hits) of the keyword in the document by traversing through the document's document tree to find pertinent entries in the document's document index table. These entries identify the locations in the document where the keyword appears.

In step 412, the invention displays these hits to the user. For example, the invention may display a portion of text in the document containing the first occurrence of the keyword. Upon appropriate user command (such as pressing the "Page Down" button on the keyboard), the invention may display a portion of text in the document containing the next occurrence of the keyword. Other schemes for displaying the hits to the user will be apparent to persons skilled in the relevant art(s).

If, in step 408, it is determined that the search request is directed to searching a group of documents, then step 410 is performed.

In step 410, the invention locates occurrences (hits) of the keyword in the documents of the group by traversing through the group's group tree to find pertinent entries in the group's group index table. These entries identify the locations in the documents of the group where the keyword appears. These hits are then displayed to the user in step 412, described above. (Although in this case, in step 412 the hits from multiple documents are displayed. The invention may allow the user to select which document he wishes to display. Then, in step 412, the invention displays the hits associated with that document.)

The above description of the invention has focused on a search containing a single keyword, but it is easily extendable to searches containing multiple keywords related to each other by boolean operators. For example, if the search is "glass and cat," the invention finds occurrences of glass and occurrences of cat. Hits for the search would be the intersection of these two hit sets.

Note that, with the first embodiment, it is possible to perform a keyword search over a document or over a group of documents by accessing either the document index table for the document of interest or the group index table for the group of interest. Thus, the first embodiment represents a one-level search mechanism.

The first embodiment, while workable, is not ideal because it is not very extendable. For example, suppose a user wishes to add documents to Group A. To do this, it would be necessary to modify the group tree 202 and the group index table 204 to reflect these new documents. This is a relatively difficult task. This difficulty results from the fact that the group index table 204 has an entry for each occurrence of each searchable word or phrase. Thus, the group index table 204 is potentially very large and, thus, difficult to modify.

Figure 5:
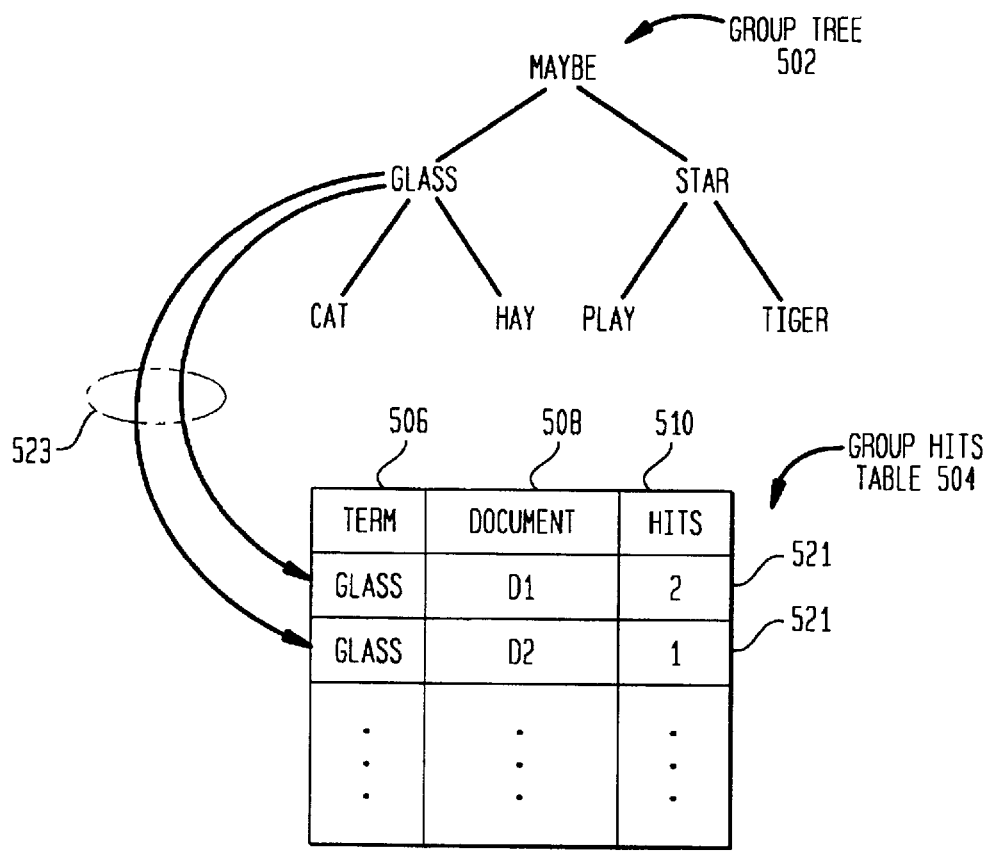
FIGS. 5 depicts a table and search tree used by a second embodiment of the present invention.

The present invention includes a second embodiment which overcomes this difficulty. According to this second embodiment, a group hits table is maintained, instead of a group index table. An example group hits table 504 for Group A and a corresponding group tree 502 are shown in FIG. 5.

The group hits table 504 includes, for each document D1–D4 in Group A, an entry 521 for each searchable term appearing in the document. For example, the word "glass" appears in document D1 and in document D2. Thus, there are two entries 521 in the group hits table 504 for the word "glass," one corresponding to document D1 and another corresponding to document D2.

Each entry 521 includes a term field 506, a document field 508, and a hits field 510. The term field 506 identifies the searchable word (or phrase), the document field 508 identifies the document where the word appears, and the hits field 510 identifies the number of times that the word appears in the document.

The group tree 502 has the same structure and function, and is used in the same way, as the group tree 202 shown in FIG. 2. The second embodiment also includes a document tree and a document index table for each document in each group. The document tree and document index table were described above.

Figure 6:
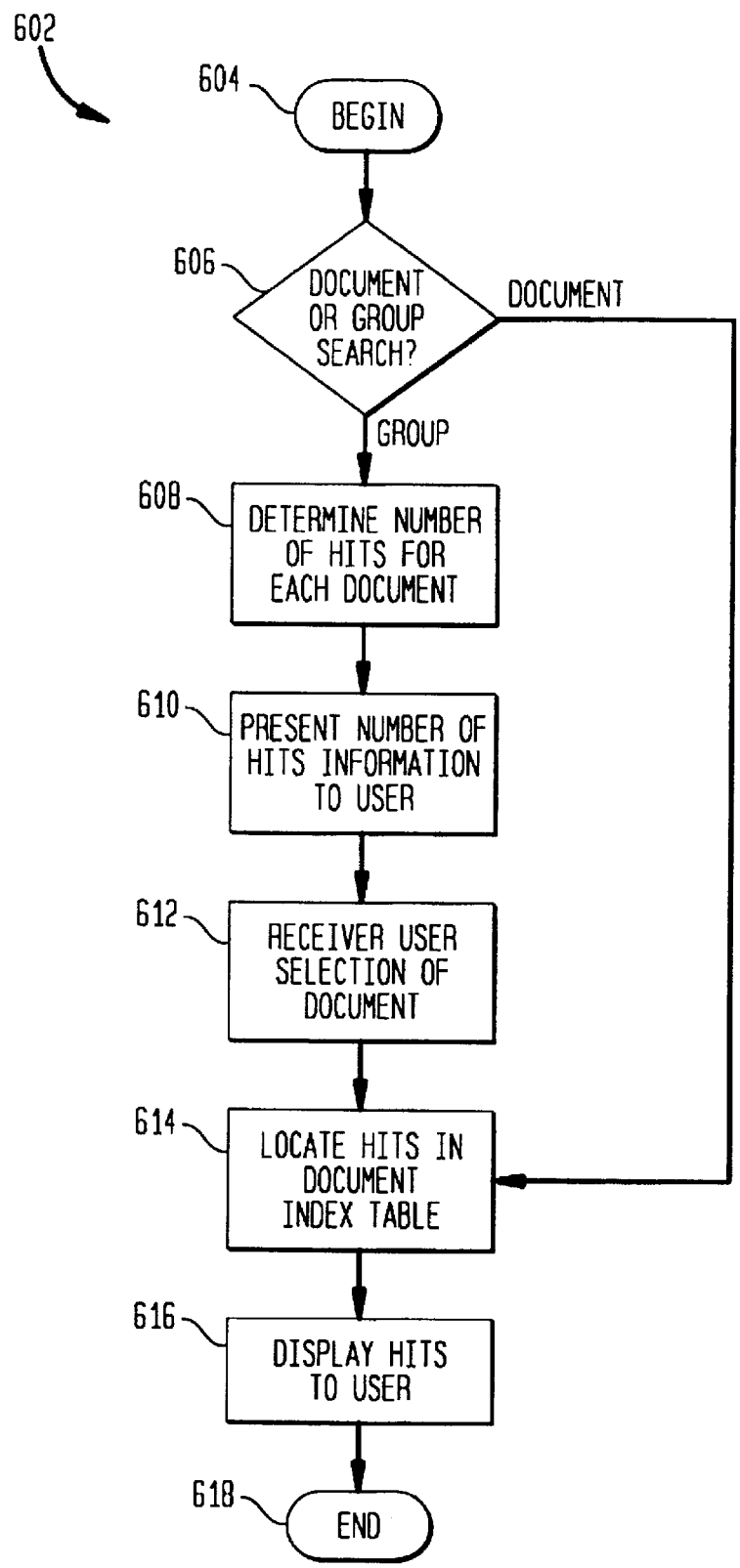
FIG. 6 is a flowchart depicting the operation of the second embodiment of the present invention.

The manner in which the present invention performs electronic keyword searches through an individual document (in electronic form), and/or through a group of documents (in electronic form), according to the second embodiment shall now be described with reference to a flowchart 602 shown in FIG. 6. Flowchart 602 begins with step 604, where control immediately passes to step 606.

In step 606, the invention receives a user search request containing a keyword and determines whether the search request is directed to searching an individual document or a group of documents. If the search request is directed to searching a group of documents, then step 608 is performed.

In step 608, the invention determines the number of occurrences (hits) of the keyword in each of the documents in the group by traversing through the group's group tree to find pertinent entries in the group's group hits table. These entries identify the number of times that the keyword appears in each document of the group.

In step 610, the invention presents this hits information to the user. For example, if Group A is the group being searched and the keyword is "glass," then the invention displays the following hit information to the user:

Document D1 2 hits
Document D2 1 hit

In step 612, the invention receives a command from the user indicating which document the user wishes to view (in the above example, the command indicates whether the user wants to view Document D1 or Document D2).

In step 614, the invention locates occurrences (hits) of the keyword in the user-selected document by traversing through the document's document tree to find pertinent entries in the document's document index table. These entries identify the locations in the document where the keyword appears.

In step 616, the invention displays these hits to the user. For example, the invention may display a portion of text in the document containing the first occurrence of the keyword. Upon appropriate user command (such as pressing the "Page Down" button on the keyboard), the invention may display a portion of text in the document containing the next occurrence of the keyword. Other schemes for displaying the hits to the user will be apparent to persons skilled in the relevant art(s).

If, in step 606, it is determined that the search request is directed to searching a single document, then steps 614 and 616 are performed (described above).

The above description of the invention has focused on a search containing a single keyword, but it is easily extendable to searches containing multiple keywords related to each other by boolean operators.

The second embodiment is much more extendable than the first embodiment. This is because the group hits table 504 has only one entry (instead of potentially multiple entries) for each searchable word in each document of the group. Thus, the group hits table 504 is much smaller than the group index table 204. Accordingly, it is much easier to modify to accommodate document additions to the group.

Note that, with the second embodiment, it is possible to perform a keyword search over a document by accessing the document's document index table. This is a one level search. However, in order to perform a keyword search over a group of documents, it is necessary to first search the group hits table, and then search the document index table of each document of interest (i.e., each document selected by the user). This is a two level search, since it involves two table accesses.

However, the second embodiment is no less efficient from a user's point of view than the first embodiment, even though the second embodiment sometimes requires two table accesses, whereas the first embodiment always requires just a single table access. This is because there is user interaction (steps 610 and 612) between the first search (step 608) and the second search (step 614). Thus, the performance of the second search typically has no impact on the user's perception of the system.

Figure 7:
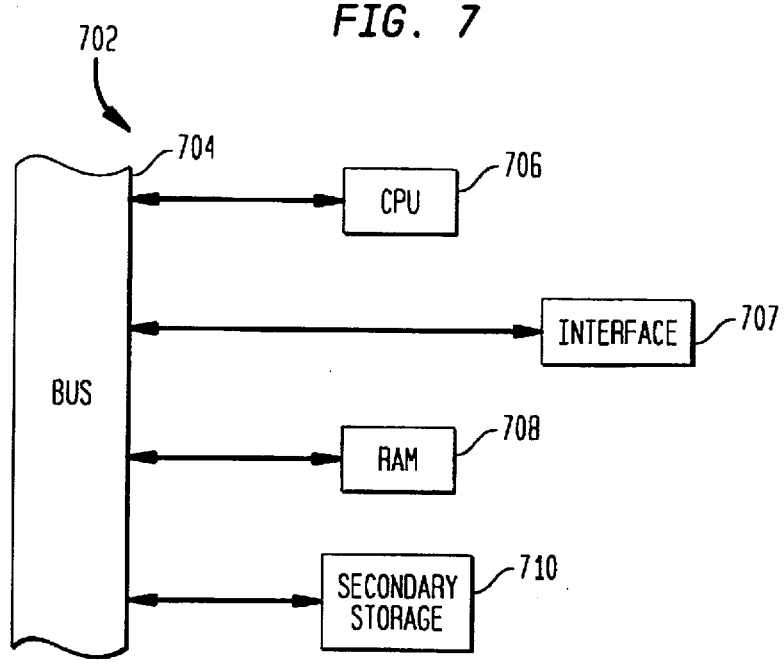
FIG. 7 is a block diagram of a preferred computer system used to implement the present invention.

Preferably, the present invention is a computer program executing in a computer system 702 such as that shown in FIG. 7. This computer system 702 includes a central processing unit (CPU) 706 connected to a bus 704, and a random access memory (RAM) 708 and secondary storage devices 710 also connected to the bus 704. The computer program of the present invention resides in RAM 708 while executing. The tables and trees discussed herein are also preferably stored in RAM 708 during execution. The computer program includes instructions that, when executed, cause the CPU 706 to perform the functions described herein. In one embodiment, the logic of the computer program is stored in a computer readable medium of a removable computer disk, such as a floppy disk or compact disk. In another embodiment, the invention represents an on-line service (such as a computer bulletin board), and the search mechanisms discussed herein allow subscribers to efficiently search through the information stored in such on-line services. In this regard, the computer system 702 also includes an interface 707 (such as a network interface or a modem) for allowing remote interaction with users.

The tables and search trees discussed herein may be generated in any well known manner using manual, automated, and/or semi-automated procedures. A preferred procedure for generating such tables and trees is described in parent applications Ser. No. 08/341,129 filed Nov. 18, 1994, and Ser. No. 08/155,752 filed Nov. 19, 1993, both entitled "Method and Apparatus for Synchronizing, Displaying and Manipulating Text and Image Documents," both incorporated herein by reference in their entireties. Preferred user interfaces for enabling the user to select search options and to enter search terms, and for displaying search results to users, are also described in these applications.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method of searching through documents maintained in electronic form, comprising the steps of:

(1) locating one or more hit entries in a group hits table associated with at least one search keyword, said located hit entries corresponding to documents in which said at least one search keyword appears; and (2) locating one or more location entries in a document index table associated with one of said documents in which said at least one search keyword appears, said located location entries associated with said at least one search keyword, each of said located location entries corresponding to a different occurrence of said at least one search keyword in said one of said documents.

2. The method of claim 1, further comprising the steps of:

(3) extracting from said located hit entries hit information indicating the number of times said at least one search keyword appears in documents respectively associated with said located hit entries; and (4) presenting said hit information to a user.

3. The method of claim 2, further comprising the step of:

(5) receiving from said user a command identifying said one of said documents from said hit information presented to said user.

4. The method of claim 1, further comprising the step of:

(3) presenting to a user portions of said one of said documents containing occurrences of said at least one search keyword as identified by said located location entries.

5. The method of claim 4 in which each of said located location entries includes location information identifying a location in said one of said documents where said at least one search keyword appears, wherein step (3) comprises the steps of:

selecting one of said located location entries;

extracting location information from said selected entry; and using said extracted location information to display a portion of text from said one of said documents containing said at least one search keyword.

6. The method of claim 1, wherein said documents are patents.

7. A system of searching through documents maintained in electronic form, comprising:

group hits table locating means for locating one or more hit entries in a group hits table associated with at least one search keyword, said located hit entries corresponding to documents in which said at least one search keyword appears; and document index table locating means for locating one or more location entries in a document index table associated with one of said documents in which said at least one search keyword appears, said located location entries associated with said at least one search keyword, each of said located location entries corresponding to a different occurrence of said at least one search keyword in said one of said documents.

8. The system of claim 7, further comprising:

means for extracting from said located hit entries hit information indicating the number of times said at least one search keyword appears in documents respectively associated with said located hit entries; and means for presenting said hit information to a user.

9. The system of claim 8, further comprising:

means for receiving from said user a command identifying said one of said documents from said hit information presented to said user.

10. The system of claim 7, further comprising:

document presenting means for presenting to a user portions of said one of said documents containing occurrences of said at least one search keyword as identified by said located location entries.

11. The system of claim 10 in which each of said located location entries includes location information identifying a location in said one of said documents where said at least one search keyword appears, wherein said document presenting means comprises:

means for selecting one of said located location entries;

means for extracting location information from said selected entry; and means for using said extracted location information to display a portion of text from said one of said documents containing said at least one search keyword.

12. The system of claim 7, wherein said documents are patents.

13. A computer program product comprising a computer useable medium having computer program logic stored therein, said computer program logic comprising:

group hits table locating means for enabling a computer to locate one or more hit entries in a group hits table associated with at least one search keyword, said located hit entries corresponding to documents in which said at least one search keyword appears; and document index table locating means for enabling the computer to locate one or more location entries in a document index table associated with one of said documents in which said at least one search keyword appears, said located location entries associated with said at least one search keyword, each of said located location entries corresponding to a different occurrence of said at least one search keyword in said one of said documents.

14. The computer program product of claim 13, wherein said computer program logic further comprises:

means for enabling the computer to extract from said located hit entries hit information indicating the number of times said at least one search keyword appears in documents respectively associated with said located hit entries; and means for enabling the computer to present said hit information to a user.

15. The computer program product of claim 14, wherein said computer program logic further comprises:

means for enabling the computer to receive from said user a command identifying said one of said documents from said hit information presented to said user.

16. The computer program product of claim 13, wherein said computer program logic further comprises:

document presenting means for enabling the computer to present to a user portions of said one of said documents containing occurrences of said at least one search keyword as identified by said located location entries.

17. The computer program product of claim 16 in which each of said located location entries includes location information identifying a location in said one of said documents where said at least one search keyword appears, wherein said document presenting means comprises:

means for enabling the computer to select one of said located location entries;

means for enabling the computer to extract location information from said selected entry; and means for enabling the computer to use said extracted location information to display a portion of text from said one of said documents containing said at least one search keyword.

18. The computer program product of claim 13, wherein said documents are patents.

19. A system, comprising:

a group hits table having a plurality of group hits table entries, each of said group hits table entries identifying a first term, one of a plurality of documents, and the number of occurrences of said first term in said one document;

a document index table for each of said plurality of documents, said document index table including a document index table entry for each term that appears in said each of said documents, said document index table entry identifying a second term and having location information that specifies a location in said each of said documents where an occurrence of said second term exists;

means for locating one or more group hits table entries from said group hits table associated with at least one keyword in a search request, each of said located group hits table entries corresponding to a different one of said documents in which said at least one keyword appears; and means for locating at least one document index table entry in a document index table associated with one of said documents associated with said located group hits table entries, said at least one located document index table entry associated with said at least one keyword, each said at least one located document index table entry having location information specifying a location in said one of said documents of an occurrence of said at least one keyword in said one of said documents.

20. The system of claim 19, further comprising means for generating said group hits table and said document index table for each of said documents prior to receiving any search requests.

21. The system of claim 19, wherein said location information specifies only a line in said each of said documents where said occurrence of said second term exists.

22. The system of claim 19, further comprising:
group hits table modifying means for modifying said group hits table to accommodate a new document.

23. The system of claim 22, wherein said group hits table modifying means comprises:
means for adding a new entry into said group hits table; and
means for storing information in said new entry identifying a third term present in said new document, said new document, and the number of occurrences of said third term in said new document.

24. A method, comprising:
maintaining a group hits table having a plurality of group hits table entries, each of said group hits table entries identifying a first term, one of a plurality of documents, and the number of occurrences of said first term in said one document;
maintaining a document index table for each of said plurality of documents, said document index table including a document index table entry for each term that appears in said each of said documents, said document index table entry identifying a second term and having location information that specifies a location in said each of said documents where an occurrence of said second term exists;
locating one or more group hits table entries from said group hits table associated with at least one keyword in a search request, each of said located group hits table entries corresponding to a different one of said documents in which said at least one keyword appears; and
locating at least one document index table entry in a document index table associated with one of said documents associated with said located group hits table entries, said at least one located document index table entry associated with said at least one keyword, each said at least one located document index table entry having location information specifying a location in said one of said documents of an occurrence of said at least one keyword in said one of said documents.

25. The method of claim 24, further comprising the step of generating said group hits table and said document index table for each of said documents prior to receiving any search requests.

26. The method of claim 24, wherein said location information specifies only a line in said each of said documents where said occurrence of said second term exists.

27. The method of claim 24, further comprising the step of:
(a) modifying said group hits table to accommodate a new document.

28. The method of claim 27, wherein step (a) comprises the steps of:
adding a new entry into said group hits table; and
storing information in said new entry identifying a third term present in said new document, said new document, and the number of occurrences of said third term in said new document.

29. A computer program product comprising a computer useable medium having computer program logic stored therein, said computer program logic comprising:
means for enabling a computer to maintain a group hits table having a plurality of group hits table entries, each of said group hits table entries identifying a first term, one of a plurality of documents, and the number of occurrences of said first term in said one document;
means for enabling the computer to maintain a document index table for each of said plurality of documents, said document index table including a document index table entry for each term that appears in said each of said documents, said document index table entry identifying a second term and having location information that specifies a location in said each of said documents where an occurrence of said second term exists;
means for enabling the computer to locate one or more group hits table entries from said group hits table associated with at least one keyword in a search request, each of said located group hits table entries corresponding to a different one of said documents in which said at least one keyword appears; and
means for enabling the computer to locate at least one document index table entry in a document index table associated with one of said documents associated with said located group hits table entries, said at least one located document index table entry associated with said at least one keyword, each said at least one located document index table entry having location information specifying a location in said one of said documents of an occurrence of said at least one keyword in said one of said documents.

30. The computer program product of claim 29, wherein said computer program logic further comprises means for enabling the computer to generate said group hits table and said document index table for each of said documents prior to receiving any search requests.

31. The computer program product of claim 29, wherein said location information specifies only a line in said each of said documents where said occurrence of said second term exists.

32. The computer program product of claim 29, wherein said computer program logic further comprises:
group hits table modifying means for enabling the computer to modify said group hits table to accommodate a new document.

33. The computer program product of claim 32, wherein said group hits table modifying means comprises:
means for enabling the computer to add a new entry into said group hits table; and
means for enabling the computer to store information in said new entry identifying a third term present in said new document, said new document, and the number of occurrences of said third term in said new document.

* * * * *